United States Patent
Shigee

(10) Patent No.: US 9,106,774 B2
(45) Date of Patent: Aug. 11, 2015

(54) COMMUNICATION APPARATUS, IMAGE FORMING APPARATUS, AND CONTROL METHOD FOR COMMUNICATION APPARATUS

(71) Applicant: KYOCERA Document Solutions Inc., Osaka (JP)

(72) Inventor: Yuki Shigee, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/460,255

(22) Filed: Aug. 14, 2014

(65) Prior Publication Data
US 2015/0062627 A1    Mar. 5, 2015

(30) Foreign Application Priority Data
Aug. 28, 2013  (JP) ................. 2013-176806

(51) Int. Cl.
*G06F 3/12*    (2006.01)
*H04N 1/00*    (2006.01)

(52) U.S. Cl.
CPC .................... *H04N 1/001* (2013.01)

(58) Field of Classification Search
CPC .......... H04N 1/2404; H04N 21/44209; H04N 21/6375; H04N 21/6112; H04N 21/6437; H04N 21/6473; H04N 5/44543; H04N 5/44591; H04N 7/17318; G06F 21/55; G06K 15/102; G06K 15/1894; G06K 15/408
USPC .................................................. 358/1.15, 1.1
See application file for complete search history.

(56) References Cited

U.S. PATENT DOCUMENTS

2002/0131399 A1*  9/2002  Philonenko .................. 370/351
2006/0034327 A1*  2/2006  Tanimoto ..................... 370/466

FOREIGN PATENT DOCUMENTS

JP          5-252305 A        9/1993

* cited by examiner

*Primary Examiner* — Martin Mushambo
(74) *Attorney, Agent, or Firm* — Stein IP, LLC

(57) ABSTRACT

A communication apparatus includes a communication unit. When receiving a request to start communication from a second communication apparatus during communication with a first communication apparatus, the communication unit transmits to the second communication apparatus a communication disabled notification with a retransmission time period indicating a time until the request to start communication again. In addition, when receiving a request to start communication from a third communication apparatus after completing the communication with the first communication apparatus and before receiving the request to start communication sent again from the second communication apparatus based on the retransmission time period, the communication unit does not start data reception from the third communication apparatus so as to give priority to data communication with the second communication apparatus.

9 Claims, 8 Drawing Sheets

COMMUNICATION APPARATUS, IMAGE FORMING APPARATUS, AND CONTROL METHOD FOR COMMUNICATION APPARATUS

CROSS-REFERENCE TO RELATED APPLICATIONS

This application is based upon and claims the benefit of priority from the corresponding Japanese Patent Application No. 2013-176806, filed Aug. 28, 2013, the entire contents of which are incorporated herein by reference.

BACKGROUND OF THE INVENTION

1. Field of the Invention

The present disclosure relates to a communication apparatus performing data communication such as facsimile communication.

2. Description of the Related Art

For instance, in a communication apparatus such as a facsimile apparatus, image data transmission and reception is performed. First, a transmission side transmits a request to start communication. Then, a reception side receives the request to start communication. Exchange of predetermined signals is performed and a communication path is established. After that, data transmission and reception is performed. Further, after receiving the request to start communication, when the data communication cannot be started because of being communicating with other communication apparatus or other reason, the reception side communication apparatus sends back a communication disabled notification to the transmission side communication apparatus. When receiving the communication disabled notification, the transmission side communication apparatus may wait to transmit the request to start communication again to the reception side communication apparatus (redial or retry). When the communication disabled notification is returned again after the retransmission, the transmission side communication apparatus will transmit the request to start communication repeatedly.

In order to avoid repetition of the redial (recall), there is known a facsimile apparatus, which is connected to an Integrated Services Digital Network, predicts a time period until a busy state is released when a calling is received during the busy state, and sets the predicted time period in a release completion message to be sent to a calling side facsimile apparatus.

Here, a communication line is used for retransmission of the request to start communication and reply of the communication disabled notification in response to the request to start communication. Repetition of the redial (resending of the request to start communication) is not preferred for efficient communication. In addition, when the data communication cannot be completed even if the redial is repeated the upper limit number of times, a communication error process is performed. When the communication error process is performed, the data remains to be unreached. Therefore, it is preferred to set the number of redial times to be as small as possible.

Here, in the known technique described above, the predicted time period is sent to the calling side facsimile apparatus. However, when there is an interrupt of an incoming call from other facsimile apparatus before calling based on the predicted time period, communication may start between the interrupting facsimile apparatus and the facsimile apparatus that has transmitted the predicted time period. Then, even if the redial is performed based on the predicted time period, data communication cannot be started because the communication is being performed. Then, the redial is required to be performed again. Therefore, the known technique also has the problem that repetition of the redial (recall) may occur.

In this way, the known technique is not sufficient to prevent the retransmission (redial) of the request to start communication, and has the problem that the redial is repeated so that communication efficiency may be largely decreased.

SUMMARY OF THE INVENTION

A communication apparatus according to a first aspect of the present disclosure includes a communication unit performing data communication via a network. When receiving a request to start communication from a second communication apparatus during data communication with a first communication apparatus, the communication unit transmits to the second communication apparatus a communication disabled notification together with a retransmission time period to indicate a time period for the second communication apparatus to send the request to start communication again. When receiving a request to start communication from a third communication apparatus after data communication with the first communication apparatus is completed and before receiving a request to start communication from the second communication apparatus again based on the retransmission time period, the communication unit does not start data reception from the third communication apparatus so as to give priority to data communication with the second communication apparatus.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Now, an embodiment of the present disclosure is described with reference to FIG. 1 to FIG. 8. Here, in this description, a communication apparatus 1 having a facsimile communication function is exemplified and described as an apparatus according to the present disclosure, which performs data transmission and reception in which priority is given to communication with a communication apparatus that has performed retransmission (redial) of a request to start communication, repetition of redial is prevented, and communication efficiency is increased. As this communication apparatus 1, a multifunction peripheral 100 is exemplified and described. However, element such as structures and layouts described in this embodiment are merely examples and should not be interpreted as limiting the scope of the disclosure.

(Outline of Communication System 1000)

Figure 1:
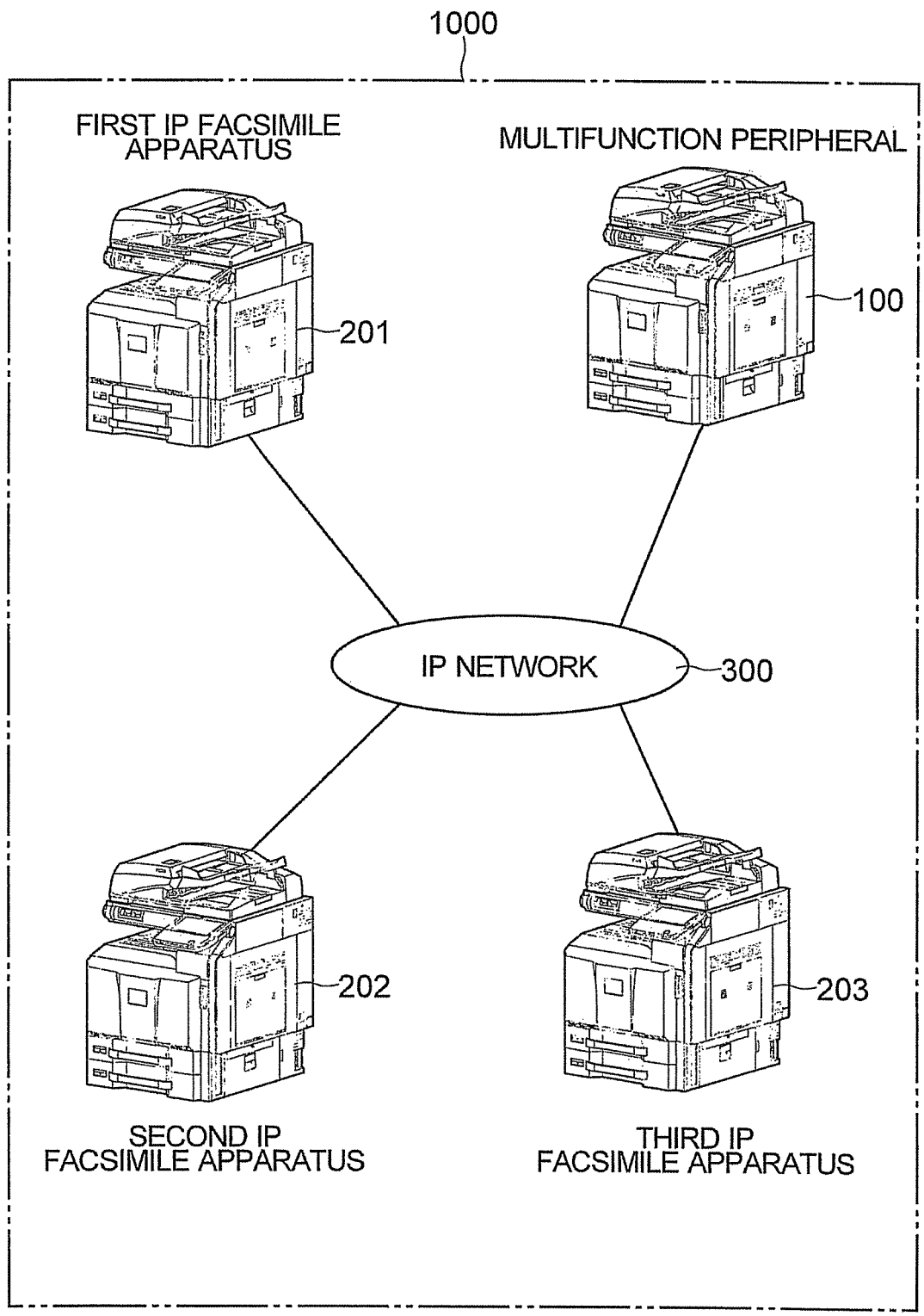
FIG. 1 is a diagram illustrating a communication system.

First, with reference to FIG. 1, outline of the communication system 1000 including the multifunction peripheral 100 according to the embodiment is described. FIG. 1 is a diagram illustrating the communication system 1000.

The communication system 1000 illustrated in FIG. 1 includes the multifunction peripheral 100 (corresponding to an image forming apparatus) connected to an IP network 300 (corresponding to a network), a first IP facsimile apparatus 201 (corresponding to a first communication apparatus), a second IP facsimile apparatus 202 (corresponding to a second communication apparatus), a third IP facsimile apparatus 203 (corresponding to a third communication apparatus), and the like. Note that the communication system 1000 may include more IP facsimile apparatuses, but in the following description, the first to third IP facsimile apparatuses 201 to 203 are exemplified and described for convenience sake.

The multifunction peripheral 100 of this embodiment has a plurality of functions such as a print function, a transmission function, a scan function, and the like. Further, the multifunction peripheral 100 according to this embodiment is connected to the IP network 300 in a communicable manner. The multifunction peripheral 100 can perform facsimile communication via the IP network 300 with each IP facsimile apparatus connected to the IP network 300. In this way, the multifunction peripheral 100 can be said to be the IP facsimile apparatus and also to be the communication apparatus 1.

In addition, the IP facsimile apparatuses (201, 202, and 203) have a plurality of functions such as a print function, a transmission function, and a scan function similarly to the multifunction peripheral 100 of this embodiment (the same type as the multifunction peripheral 100). Note that each IP facsimile apparatus may be a specialized machine having only the facsimile function. Further, one of the IP facsimile apparatuses can perform facsimile communication with the multifunction peripheral 100 or other IP facsimile apparatus. The facsimile data transmitted by the facsimile communication is image data in an example of this embodiment.

Note that in the following description, the multifunction peripheral 100 and the IP facsimile apparatuses (201, 202, and 203) are exemplified as the communication apparatuses, and the IP network 300 is exemplified as the communication network. However, the apparatus performing the data communication is not limited to the IP facsimile apparatus, and the communication path is not limited to the IP network 300.

(Outline of Multifunction Peripheral 100)

Figure 2:
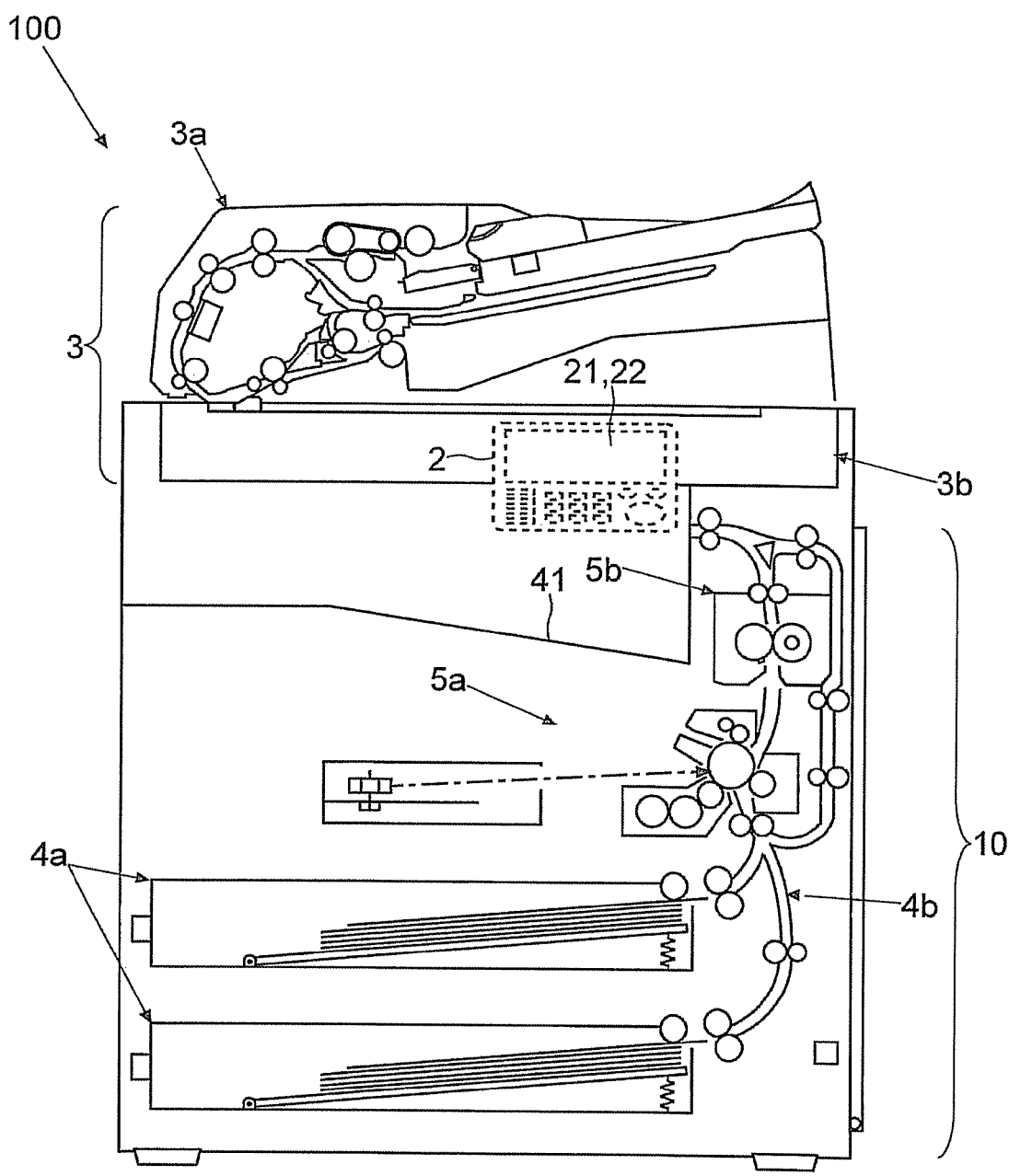
FIG. 2 is a diagram illustrating a structure of a multifunction peripheral.

Next, with reference to FIG. 2, outline of the multifunction peripheral 100 according to the embodiment is described. FIG. 2 is a diagram illustrating a structure of the multifunction peripheral 100.

As illustrated in FIG. 2, the multifunction peripheral 100 of this embodiment includes an operation panel 2 attached to the front. Further, the multifunction peripheral 100 includes a reading unit 3 disposed on an upper part, including a document transport unit 3a and an image reading unit 3b. In addition, the multifunction peripheral 100 includes a printing unit 10 inside, including a paper sheet feeder 4a, a transport unit 4b, an image forming unit 5a, and a fixing unit 5b.

First, the operation panel 2 includes a display unit 21 for displaying a state of the multifunction peripheral 100, various messages, and a setting screen. In addition, a touch panel unit 22 is disposed on the display unit 21. The operation panel 2 accepts setting of conditions of transmission and printing such as a transmission method, a transmission destination address, a size and type of paper sheets, and a size and type of a document.

When document sheets are transported and read, the document transport unit 3a transports the document sheets placed on a document tray one by one to a reading position. The image reading unit 3b reads the transported document sheet or a document placed on the document table so as to generate document image data.

The paper sheet feeder 4a stores a plurality of paper sheets and sends out the paper sheet in printing job. The transport unit 4b transports the paper sheet supplied from the paper sheet feeder 4a to a discharge tray 41. The image forming unit 5a forms a toner image based on image data to be printed and transfers the toner image onto the paper sheet. The fixing unit 5b heats and presses the paper sheet with the transferred toner image so that the toner image is fixed to the paper sheet. The paper sheet after passing the fixing unit 5b is discharged onto the discharge tray 41. In this way, one page of printing process is completed.

(Hardware Structure of Multifunction Peripheral 100)

Figure 3:
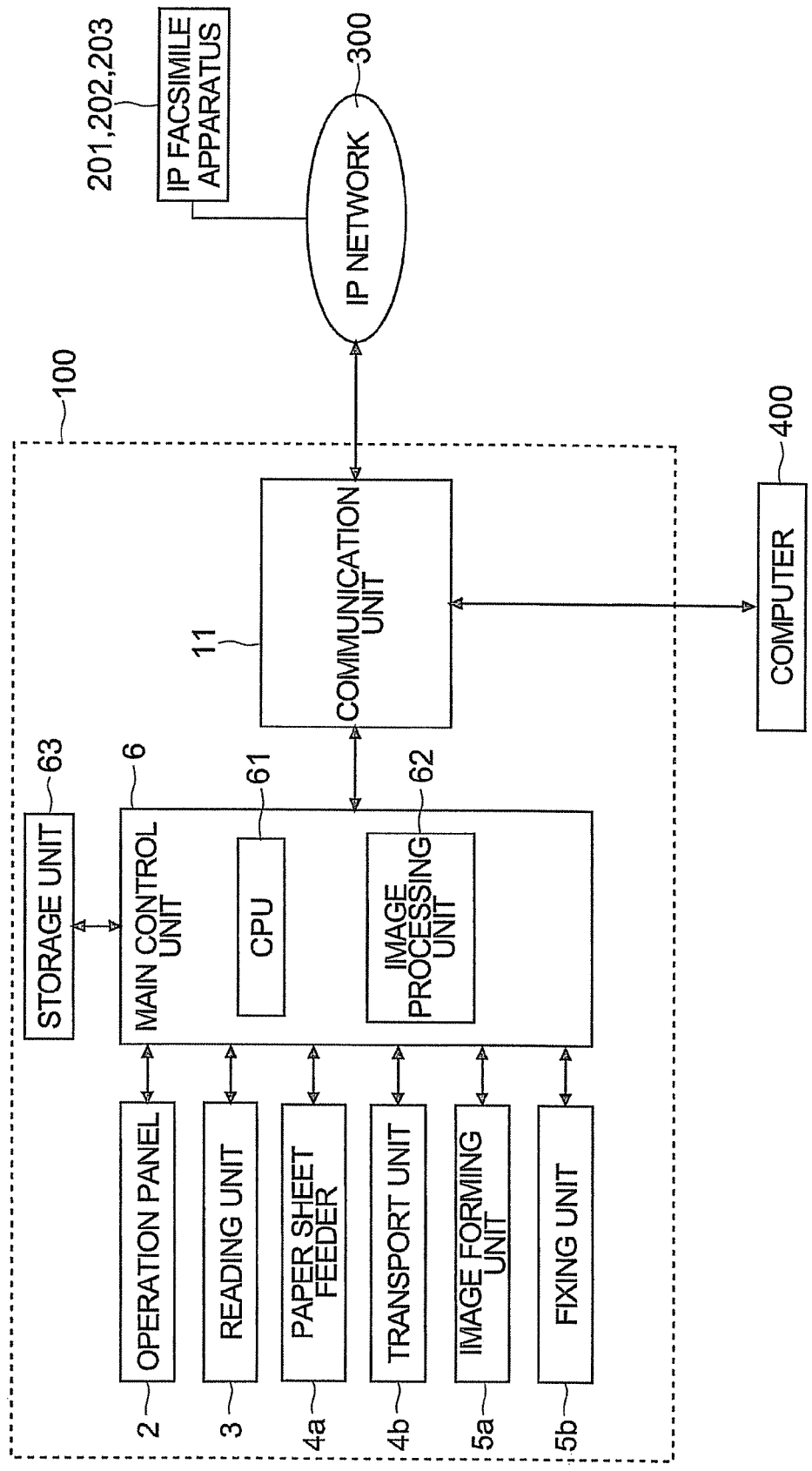
FIG. 3 is a diagram illustrating a hardware structure of the multifunction peripheral.

Next, with reference to FIG. 3, a hardware structure of the multifunction peripheral 100 according to the embodiment is described. FIG. 3 is a diagram illustrating a hardware structure of the multifunction peripheral 100.

As illustrated in FIG. 3, the multifunction peripheral 100 according to this embodiment includes a main control unit 6. The main control unit 6 controls individual units included in the multifunction peripheral 100. The main control unit 6 includes a CPU 61, an image processing unit 62 for generating image data used for printing or transmission (including facsimile communication), and other electronic circuits and elements. The CPU 61 performs control of individual units of the multifunction peripheral 100 and calculation based on a control program and control data stored in a storage unit 63. The storage unit 63 includes a ROM, a flash ROM, a RAM, and an HDD.

Further, the main control unit 6 controls operations of the printing unit 10 (paper sheet feeder 4a, transport unit 4b, image forming unit 5a, fixing unit 5b, and the like) for printing by paper sheet transportation, toner image formation, transfer, fixing, and the like, and the reading unit 3.

In addition, the main control unit 6 is connected to a communication unit 11. The main control unit 6 controls operation and communication process of the communication unit 11. The communication unit 11 is an interface for performing communication with a computer 400 such as a personal computer or a server. In addition, the communication unit 11 performs facsimile communication with each IP facsimile apparatus via the IP network 300. The communication unit 11 performs communication via a network, a connection cable, or the like. In addition, the main control unit 6 controls operations such as display of the operation panel 2. In addition, the main control unit 6 recognizes setting by the operation panel 2 so as to recognize job content, setting, and execution instruction.

The communication unit 11 can transmit the image data to the computer 400 or each IP facsimile apparatus based on reading of document by the reading unit 3 (transmission function). When performing transmission to each IP facsimile apparatus (when the execution instruction of facsimile communication is issued), the main control unit 6 generates data of a format set by the operation panel 2. Further, the main control unit 6 controls the communication unit 11 to transmit the generated data to the transmission destination set by the operation panel 2.

In addition, the communication unit 11 receives print data (including the image data and the print setting) from the computer 400 or image data from each IP facsimile apparatus. Then, the main control unit 6 controls the printing unit 10 to perform printing based on the received print data or image data (printer function and facsimile reception function).

(Communication Apparatus 1)

Figure 4:
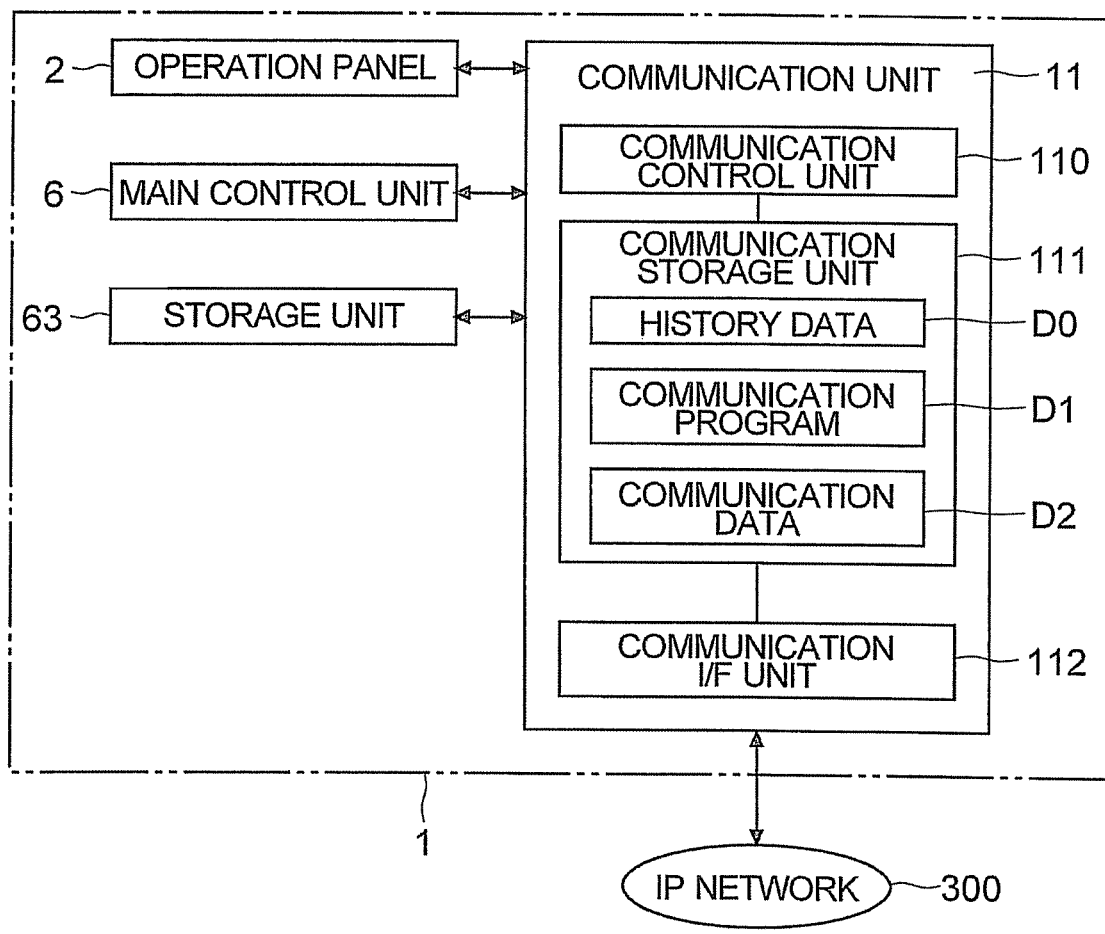
FIG. 4 is a diagram illustrating a part corresponding to a communication apparatus.

Next, with reference to FIG. 4, a part corresponding to the communication apparatus 1 included in the multifunction peripheral 100 is described. FIG. 4 is a diagram illustrating the part corresponding to the communication apparatus 1.

As illustrated in FIG. 3, the multifunction peripheral 100 includes the communication unit 11 for performing communication with each IP facsimile apparatus of the other party via the IP network 300. The communication unit 11 includes a communication control unit 110 (corresponding to a determining unit), a communication storage unit 111, a communication I/F unit 112, and the like. The communication control unit 110 actually controls operation and process of the communication unit 11 based on instructions from the main control unit 6 such as a request, a response, and data transmission received via the IP network 300. The communication control unit 110 includes a control CPU, a calculation circuit, and the like.

The communication storage unit 111 stores a communication program D1 and communication data D2. The communication control unit 110 performs a process concerning communication based on the communication program D1 and the communication data D2 stored in the communication storage unit 111. In addition, the communication storage unit 111 can be used as a buffer (temporary memory) of data in facsimile communication. The communication I/F unit 112 is an interface including a signal processing circuit and a connector or a socket to which a cable or the like for connecting to the IP network 300 is attached.

When performing facsimile transmission (when the multifunction peripheral 100 becomes a transmission source to perform facsimile communication with each IP facsimile apparatus), the main control unit 6 generates image data to be transmitted by facsimile based on image data obtained by reading document. The image data to be transmitted is temporarily stored in the storage unit 63 or the communication storage unit 111. In addition, the main control unit 6 instructs the communication control unit 110 to transmit the image data to the transmission destination (transmission destination address) set by the operation panel 2.

The communication control unit 110 controls the communication I/F unit 112 to send the request to start communication to the facsimile transmission destination address set by the operation panel 2. Next, the communication control unit 110 controls the communication I/F unit 112 to perform a predetermined communication protocol with the IP facsimile apparatus of the other party. When communication permission (reception permission) is received from the IP facsimile apparatus of the other party so that session with the facsimile apparatus is established, the communication control unit 110 controls the communication I/F unit 112 to sequentially transmit the image data stored in the storage unit 63 or in the communication storage unit 111.

On the other hand, when the facsimile reception is performed (when the multifunction peripheral 100 receives facsimile communication from one of the IP facsimile apparatuses), the communication control unit 110 performs a predetermined communication protocol with the IP facsimile apparatus of the other party. Then, the communication control unit 110 controls the communication I/F unit 112 to transmit the communication permission to the IP facsimile apparatus of the other party so as to establish the session with the facsimile apparatus of the other party. When the session is established, the communication control unit 110 receives the image data transmitted from the IP facsimile apparatus and sequentially transfers the received image data to the storage unit 63. The received image data is temporarily stored in the storage unit 63 and is used for printing or the like.

In this way, the communication unit 11, the main control unit 6, the operation panel 2, the storage unit 63, and the like in the multifunction peripheral 100 work as the communication apparatus 1. In other words, the multifunction peripheral 100 includes the communication apparatus 1.

(Priority of Redialing IP Facsimile Apparatus and its Exception)

Figure 5:
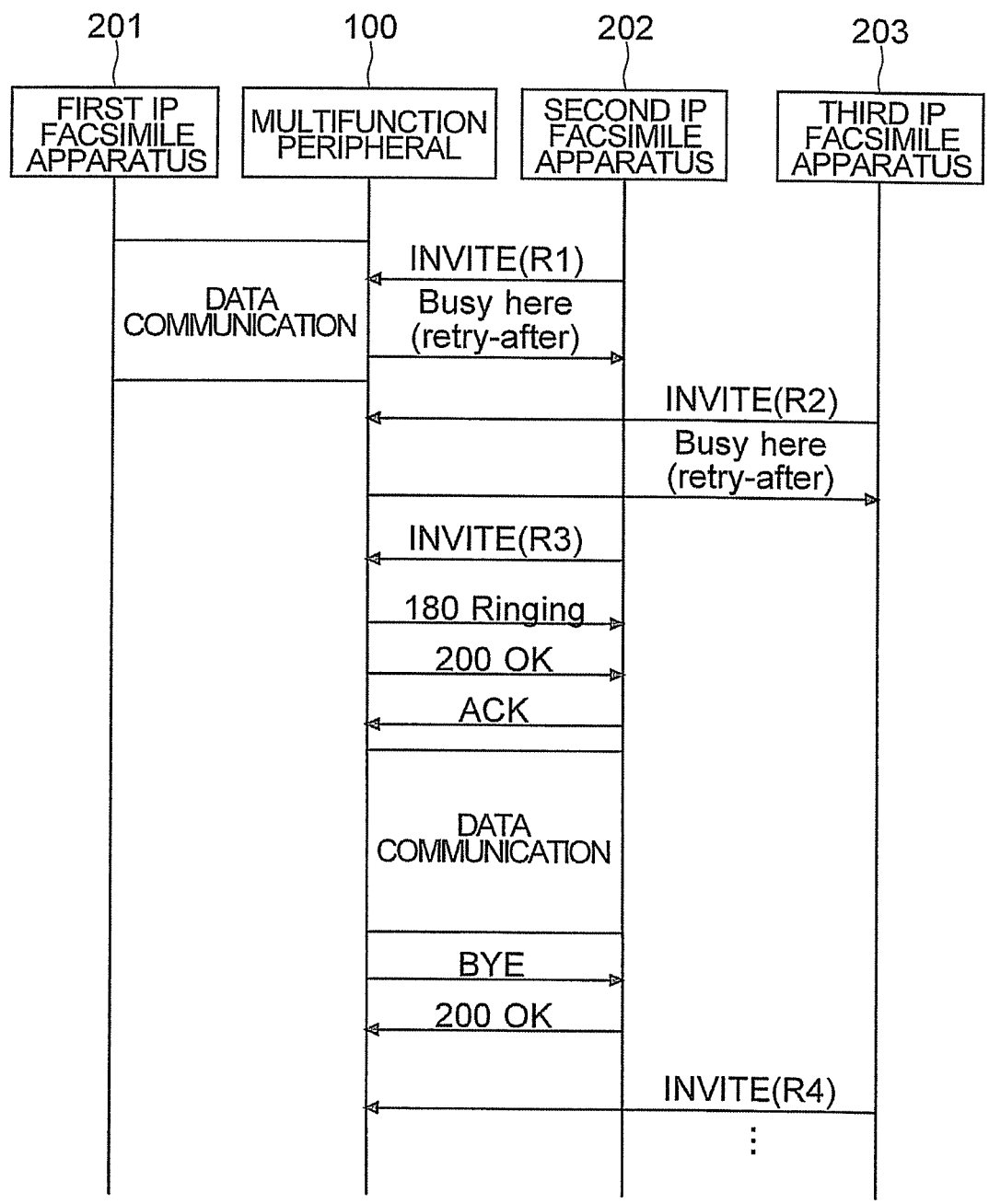
FIG. 5 is a diagram illustrating a communication control sequence when a conflict occurs between incoming calls from IP facsimile apparatuses.
Figure 6:
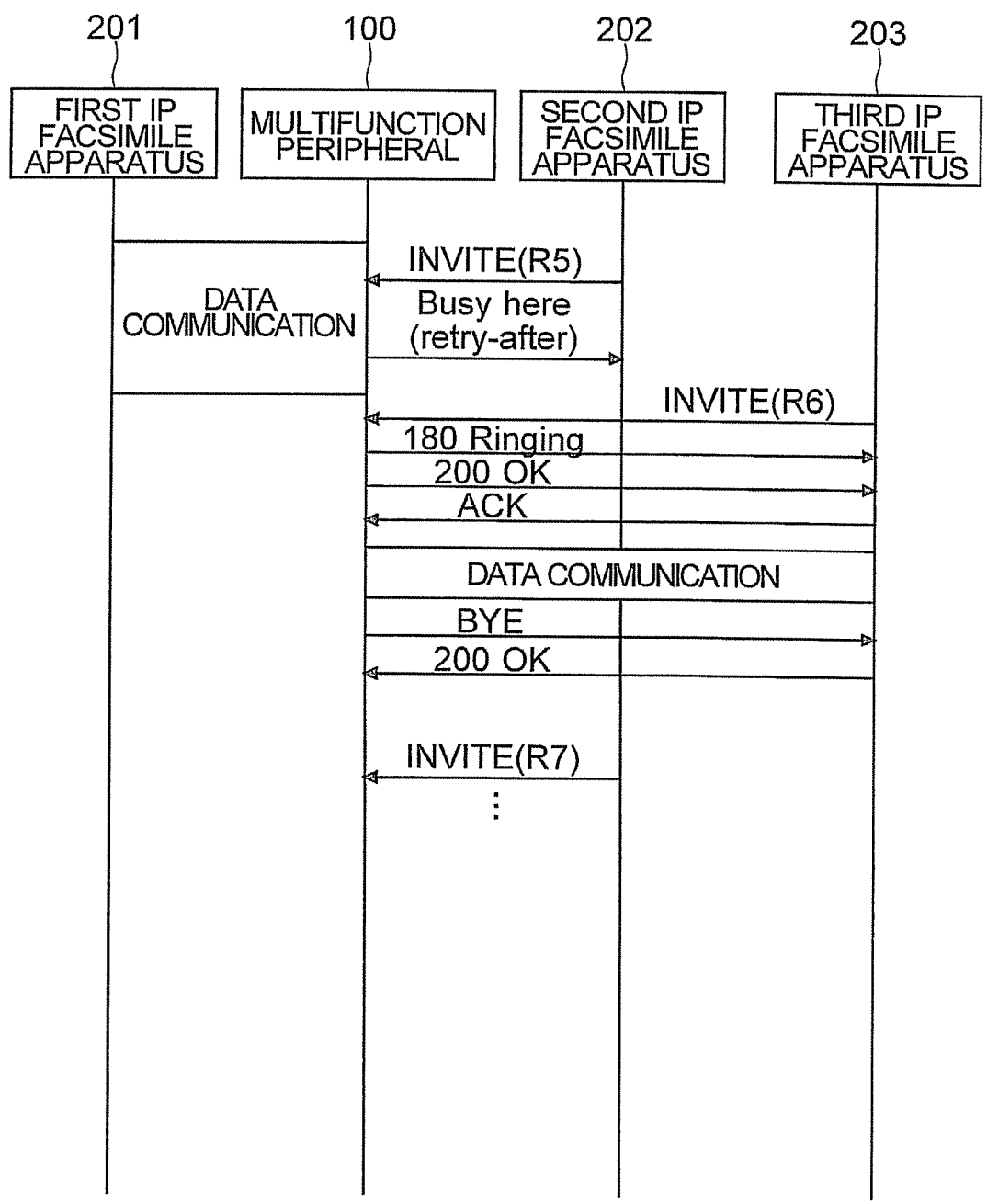
FIG. 6 is a diagram illustrating a communication control sequence when a conflict occurs between incoming calls from IP facsimile apparatuses.
Figure 7:
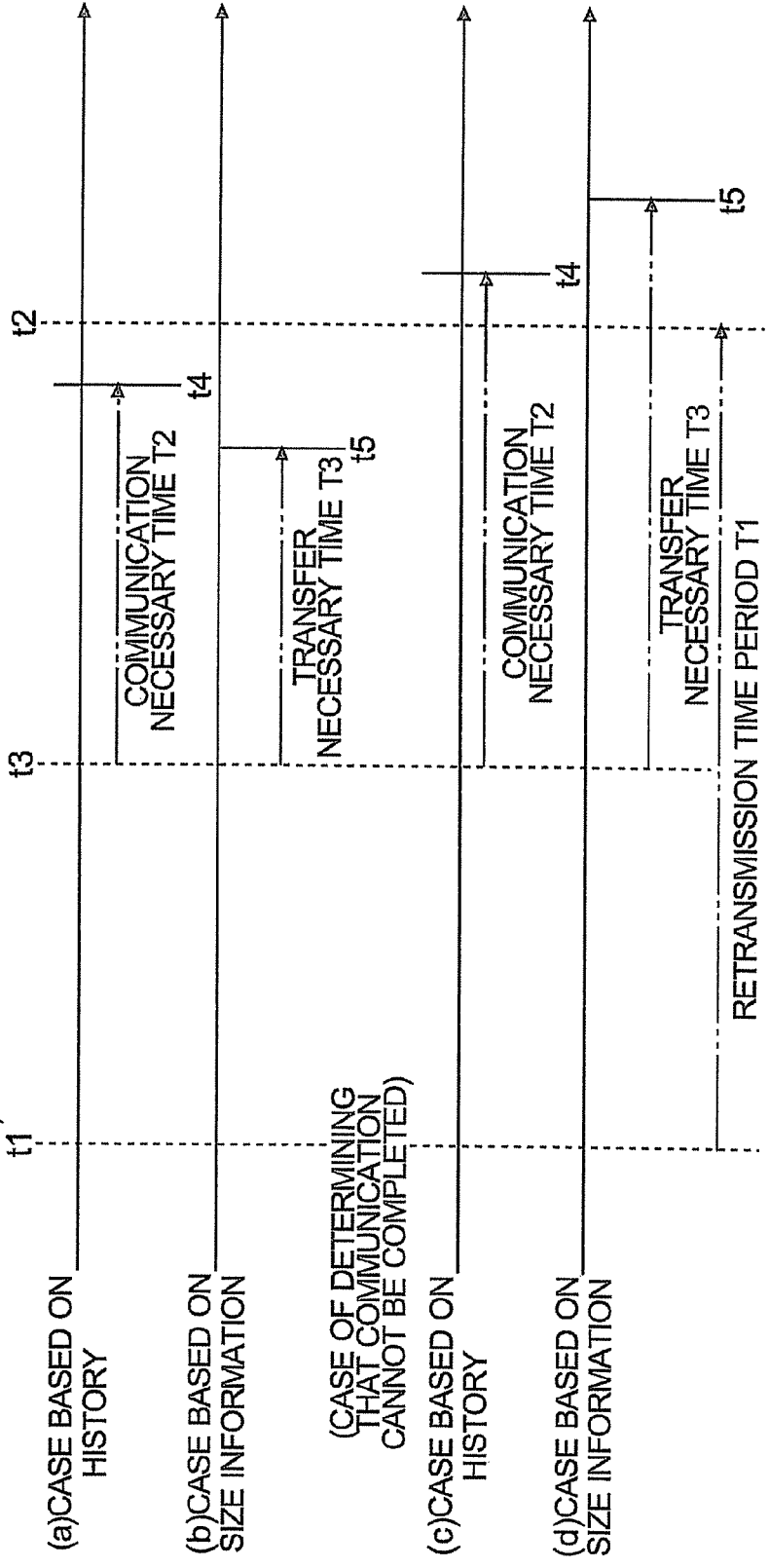
FIG. 7 is a diagram for explaining determination whether or not communication with a third IP facsimile apparatus will be completed before receiving a request to start communication sent again from a second IP facsimile apparatus.

Next, with reference to FIGS. 5 to 7, priority of a redialing IP facsimile apparatus and its exception are described. FIGS. 5 and 6 are diagrams illustrating an example of the communication control sequence when there is conflict between incoming calls from the IP facsimile apparatuses. FIG. 7 is a diagram for explaining determination whether or not communication with the third IP facsimile apparatus 203 is completed before receiving the request to start communication sent again from the second IP facsimile apparatus 202.

In FIGS. 5 and 6, the multifunction peripheral 100 (that is also the IP facsimile apparatus) including the communication apparatus 1 according to this embodiment is illustrated as the "multifunction peripheral 100". In addition, the "first IP facsimile apparatus 201" in FIGS. 5 and 6 is the IP facsimile apparatus that is performing image data communication with the multifunction peripheral 100 in an early stage of the communication sequence. In addition, the "second IP facsimile apparatus 202" and the "third IP facsimile apparatus 203" in FIGS. 5 and 6 are the facsimile apparatuses that are going to transmit the image data to the multifunction peripheral 100.

FIGS. 5 and 6 illustrate an example in which the multifunction peripheral 100 and the first IP facsimile apparatus 201 are performing image data communication when the communication unit 11 (multifunction peripheral 100) receives an INVITE request R1 or R5 from the second IP facsimile apparatus 202. Note that the INVITE request is the request to start communication and is a request for communication so as to start and establish the session.

First, even if the request to start communication is received during the data communication, communication with the IP facsimile apparatus (in this description, the second IP facsimile apparatus 202) requesting to start communication cannot be started. Therefore, as illustrated in FIGS. 5 and 6, the multifunction peripheral 100 (communication unit 11) transmits a Busy Here response to the second IP facsimile apparatus 202 that has transmitted the request to start communication during the data communication. The Busy Here response is a communication disabled notification and is a response to notify the transmission source that the communication cannot be started. In this case, the multifunction peripheral 100 sends to the second IP facsimile apparatus 202 a retransmission time period T1 indicating a predicted time when the apparatus will be a reception enabled (valid) state using a Retry-after header field in the Busy Here response.

The second IP facsimile apparatus 202 recognizes the retransmission time period T1 described in the Retry-after header field in the received communication disabled notification. Then, the second IP facsimile apparatus 202 waits for the retransmission time period T1 after receiving the communication disabled notification, and afterwards transmits again (redial) the request to start communication (INVITE request R3) to the multifunction peripheral 100. In this way, the retransmission time period T1 indicates a time period until the IP facsimile apparatus that has received the communication disabled notification will transmit the request to start communication again.

Here, when transmitting the communication disabled notification with the specified retransmission time period T1, the multifunction peripheral 100 (communication unit 11) does not start image data communication with other IP facsimile apparatus even if the request to start communication is received from the other IP facsimile apparatus, until receiving the incoming call (redial) of the request to start communication sent again from the IP facsimile apparatus to which the communication disabled notification has transmitted. In other words, the multifunction peripheral 100 gives priority to communication with the IP facsimile apparatus waiting for the redial.

However, when the image data can be received during a free time period waiting the incoming call of redial, the image data transmission and reception can be efficiently performed, and it is possible to avoid redial from the IP facsimile apparatus that has interrupted in waiting for the incoming call of redial. In this way, when the communication with the other IP facsimile apparatus can be completed before receiving the request to start communication sent again by the IP facsimile apparatus, repetition of redial does not occur. In other words, when the image data transmitted and received has such a size that does not cause being under data communication when the incoming call of redial is received, the facsimile communication between the multifunction peripheral 100 and the other IP facsimile apparatus may be allowed during the period from the communication disabled notification until the request to start communication is received again.

Therefore, when receiving the request to start communication from the third IP facsimile apparatus 203 after completing the image data communication with the first IP facsimile apparatus 201 and before receiving the request to start communication sent again from the second IP facsimile apparatus 202 based on the retransmission time period T1, the communication control unit 110 determines whether or not the communication with the third IP facsimile apparatus 203 will be completed before receiving the request to start communication sent again from the second IP facsimile apparatus 202. Note that it is not limited to perform the determination process by the communication control unit 110. The main control unit 6 or other circuit disposed for other determination process may perform the determination process. In the following description, it is supposed that the communication control unit 110 performs the determination process.

Then, when it is determined that the communication with the other IP facsimile apparatus can be completed before, the multifunction peripheral 100 (communication unit 11) releases the priority of the communication with the second IP facsimile apparatus 202 as an exception so as to perform the image data communication with the third IP facsimile apparatus 203. When it is determined that the communication with the other IP facsimile apparatus cannot be completed before, the multifunction peripheral 100 (communication unit 11) transmits the communication disabled notification with the retransmission time period T1 to the third IP facsimile apparatus 203 in order to give priority to the communication with the second IP facsimile apparatus 202.

In this case, the communication control unit 110 may determine whether or not the communication with the third IP facsimile apparatus 203 will be completed before receiving the request to start communication sent again from the second IP facsimile apparatus 202, based on communication history with the third IP facsimile apparatus 203. Specifically, the communication storage unit 111 may store address of the transmission source (each IP facsimile apparatus) of each receiving job as history data D0. In addition, the communication storage unit 111 stores the communication necessary time T2 from reception of the request to start communication until data reception is completed for each receiving job associated with the address as the history data D0.

The third IP facsimile apparatus 203 is not fixed (the address is not fixed), and is different depending on time and place. Therefore, when facsimile communication is received, the communication storage unit 111 stores the communication necessary time T2 of each receiving job as the history data D0 for each address of the IP facsimile apparatus of the transmission source. The communication storage unit 111 may store the communication necessary time T2 of the latest reception as the history data D0 for one address (in this case, it is overwritten every time when reception is performed). In addition, the communication storage unit 111 may store an average of the communication necessary time T2 of past receptions for one address as the history data D0.

Specifically, the determining process based on the history data D0 by the communication control unit 110 is described. First, the communication control unit 110 recognizes the retransmission time period T1 transmitted because of being under data communication and a time point when the communication disabled notification with the retransmission time period T1 is transmitted. In addition, the communication control unit 110 also recognizes a time point when the request to start communication is received from the third IP facsimile apparatus 203 that has interrupted in the redial wait time.

Then, the communication control unit 110 extracts the communication necessary time T2 corresponding to the third IP facsimile apparatus 203 that has transmitted the request to start communication during the redial wait time from the history data D0. Then, as illustrated in FIG. 7, the communication control unit 110 determines whether or not the image data reception from the third IP facsimile apparatus 203 will be completed, based on whether or not a time point t4 obtained by adding the extracted communication necessary time T2 to a time point t3 when the request to start communication is received from the third IP facsimile apparatus 203 is before a time point t2 when the second IP facsimile apparatus 202 sends again the request to start communication (redial) based on the retransmission time period T1 (a time point t1 of the communication disabled notification plus the retransmission time period T1).

Specifically, as illustrated in FIG. 7, when the time point t4 is before the time point t2 (when the second IP facsimile apparatus 202 is before the time point when the request to start communication (redial) is sent again), the communication control unit 110 determines that the communication with the third IP facsimile apparatus 203 will be completed before receiving the request to start communication sent again from the second IP facsimile apparatus 202 (in the case of (a)). On the other hand, when the time point t4 is equal to or after the redial time point t2, the communication control unit 110 determines that the communication with the third IP facsimile apparatus 203 will not be completed before receiving the request to start communication sent again from the second IP facsimile apparatus 202 (in the case of (c)).

Note that when the address of the third IP facsimile apparatus 203 is an address that is received first time, the communication necessary time T2 of the corresponding address is not stored in the communication storage unit 111. In this case, the communication control unit 110 may perform the determination using a default value predetermined and stored in the communication storage unit 111, or may not perform the determination so as to transmit the retransmission time period T1 and the communication disabled notification uniformly as a response to the request to start communication from the third IP facsimile apparatus 203.

In addition, the communication control unit 110 may determine whether or not the communication with the third IP facsimile apparatus 203 will be completed before receiving the request to start communication sent again from the second IP facsimile apparatus 202 based on size information received from the third IP facsimile apparatus 203. Here, the size information indicates a size of data to be transmitted from the third IP facsimile apparatus 203.

Note that the third IP facsimile apparatus 203 does not always transmit the size information at the time point of the request to start communication. Therefore, when there is no size information at the time point of the request to start communication, the determining process should be performed based on the history data D0. In addition, it is possible to perform the determining process using only the history data D0 without performing the determining process based on the size information.

When the communication unit 11 receives the size information, the communication control unit 110 calculates the time period necessary after receiving the request to start communication from the third IP facsimile apparatus 203 until completing reception of data sent from the third IP facsimile apparatus 203. For instance, the communication control unit 110 recognizes data transfer speed per unit time period when receiving the request to start communication from the third IP facsimile apparatus 203 (data amount received from the third IP facsimile apparatus 203 per unit time period). Note that communication speed with the other party is different depending on a network state or a type of communication line used on both sides. Further, the communication control unit 110 divides the data size indicated in the size information by the data transfer speed so as to determine the time period (transfer necessary time T3).

Then, as illustrated in FIG. 7, the communication control unit 110 determines whether or not the image data reception from the third IP facsimile apparatus 203 will be completed, based on whether or not a time point t5 obtained by adding the determined transfer necessary time T3 to the time point t3 when the request to start communication is received from the third IP facsimile apparatus 203 is before the time point t2 when the second IP facsimile apparatus 202 sends again the request to start communication (redial) based on the retransmission time period T1 (the time point t1 of the communication disabled notification plus the retransmission time period T1).

Specifically, as illustrated in FIG. 7, when the time point t5 is before the time point t2 (when the second IP facsimile apparatus 202 is before the time point when the request to start communication (redial) is sent again), the communication control unit 110 determines that the communication with the third IP facsimile apparatus 203 will be completed before receiving the request to start communication sent again from the second IP facsimile apparatus 202 (in the case of (b)). On the other hand, when the time point t5 is equal to or after the redial time point t2, the communication control unit 110 determines that the communication with the third IP facsimile apparatus 203 will not be completed before receiving the request to start communication sent again from the second IP facsimile apparatus 202 (in the case of (d)).

Next, with reference to FIG. 5, there is specifically described a communication control in the case where the communication control unit 110 determines that the communication with the third IP facsimile apparatus 203 will not be completed before receiving the request to start communication sent again from the second IP facsimile apparatus 202.

In FIG. 5, the multifunction peripheral 100 (communication unit 11) receives the INVITE request (request to start communication) R1 from second IP facsimile apparatus 202 during data communication with the first IP facsimile apparatus 201. Further, the multifunction peripheral 100 transmits the Busy Here response (communication disabled notification) with the retransmission time period T1 to the second IP facsimile apparatus 202. In addition, after the image data communication with the first IP facsimile apparatus 201 is completed and before receiving the INVITE request R3 sent again from the second IP facsimile apparatus 202 based on the retransmission time period T1 (during the redial wait time), the multifunction peripheral 100 receives an INVITE request R2 from the third IP facsimile apparatus 203.

In this case, the multifunction peripheral 100 does not start the image data reception from the third IP facsimile apparatus 203 and gives priority to the data communication with the second IP facsimile apparatus 202. Specifically, the multifunction peripheral 100 transmits the Busy Here response to the third IP facsimile apparatus 203. The multifunction peripheral 100 is not actually performing data communication but does not perform communication with the third IP facsimile apparatus 203 until later in order to give priority to the communication with the second IP facsimile apparatus 202.

Note that in this description, there is described an example where the Busy Here response is transmitted to the third IP facsimile apparatus 203 interrupting in the retransmission time period T1 (until the redial). However, it is possible to reply other type of response such as Temporarily Unavailable response with specifying the retransmission time period T1.

The multifunction peripheral 100 gives priority to communication with the second IP facsimile apparatus 202 that performs redial. Therefore, when receiving the INVITE request R3 sent again from the second IP facsimile apparatus 202, the multifunction peripheral 100 transmits to the second IP facsimile apparatus 202 a 180 Ringing (a response to inform that the reception side is calling) and an OK response (a response for informing that the communication is accepted) as a response to the INVITE request R3.

Then, when the second IP facsimile apparatus 202 sends back an ACK in response to the OK response, session between the multifunction peripheral 100 and the second IP facsimile apparatus 202 is established. When the session is established, the image data is transmitted from the second IP facsimile apparatus 202 to the multifunction peripheral 100 based on TCP or UDP.

When the image data transmission is completed, the multifunction peripheral 100 (communication unit 11) transmits the BYE request to the second IP facsimile apparatus 202. In response to the BYE request, the second IP facsimile apparatus 202 replies the OK response to the communication unit 11 of the multifunction peripheral 100. In this way, image data communication between the multifunction peripheral 100 and the second IP facsimile apparatus 202 is completed (completion of session).

In this way, the multifunction peripheral 100 of this embodiment gives priority to the communication with the second IP facsimile apparatus 202. As a result, after the data communication between the multifunction peripheral 100 and the second IP facsimile apparatus 202 is completed, the multifunction peripheral 100 receives an INVITE request R4 from the third IP facsimile apparatus 203 again. In order that the third IP facsimile apparatus 203 transmits again the INVITE request R4 (redial) after the facsimile communication between the second IP facsimile apparatus 202 and the multifunction peripheral 100, the multifunction peripheral 100 (communication control unit 110) describes a sufficiently long retransmission time period T1 in the Retry-after header field in the Busy Here response to the third IP facsimile apparatus 203.

Next, with reference to FIG. 6, there is specifically described the communication control in the case where the communication control unit 110 determines that the communication with third IP facsimile apparatus will be completed before receiving the request to start communication sent again from the second IP facsimile apparatus 202.

In the example of FIG. 6, the multifunction peripheral 100 (communication unit 11) receives the INVITE request R5 (request to start communication) from the second IP facsimile apparatus 202 during data communication with the first IP facsimile apparatus 201. Then, the multifunction peripheral 100 transmits the Busy Here response (communication disabled notification) and the retransmission time period T1 to the second IP facsimile apparatus 202. In addition, after the image data communication with the first IP facsimile apparatus 201 is completed, before receiving an INVITE request R7 sent again from the second IP facsimile apparatus 202 based on the retransmission time period T1 (during the redial wait time), the multifunction peripheral 100 receives an INVITE request R6 from the third IP facsimile apparatus 203.

In this case, the communication control unit 110 determines that the data communication with the third IP facsimile apparatus 203 will be completed before receiving the redial from the second IP facsimile apparatus 202. Therefore, the multifunction peripheral 100 starts to receive the image data from the third IP facsimile apparatus 203 as an exception.

In this case, when receiving the INVITE request R6 sent again from the third IP facsimile apparatus 203, the multifunction peripheral 100 transmits to the third IP facsimile apparatus 203 the 180 Ringing (the response to inform that the reception side is calling) and the OK response (the response for informing that the communication is accepted) as a response to the INVITE request R6.

Then, the third IP facsimile apparatus 203 sends back the ACK in response to the OK response, and hence the session between the multifunction peripheral 100 and the third IP facsimile apparatus 203 is established. When the session is established, the image data is transmitted from the third IP facsimile apparatus 203 to the multifunction peripheral 100. In accordance with the determination based on the history and the size information, the data communication between the multifunction peripheral 100 and the third IP facsimile apparatus 203 is completed in a short time period. Then, the multifunction peripheral 100 transmits the BYE request to the third IP facsimile apparatus 203, and the third IP facsimile apparatus 203 replies the OK response in response to the BYE request. In this way, the image data communication between the multifunction peripheral 100 and the third IP facsimile apparatus 203 is completed before receiving the INVITE request R7 sent again from the second IP facsimile apparatus 202 (completion of session).

(Flow of Facsimile Communication Control)

Figure 8:
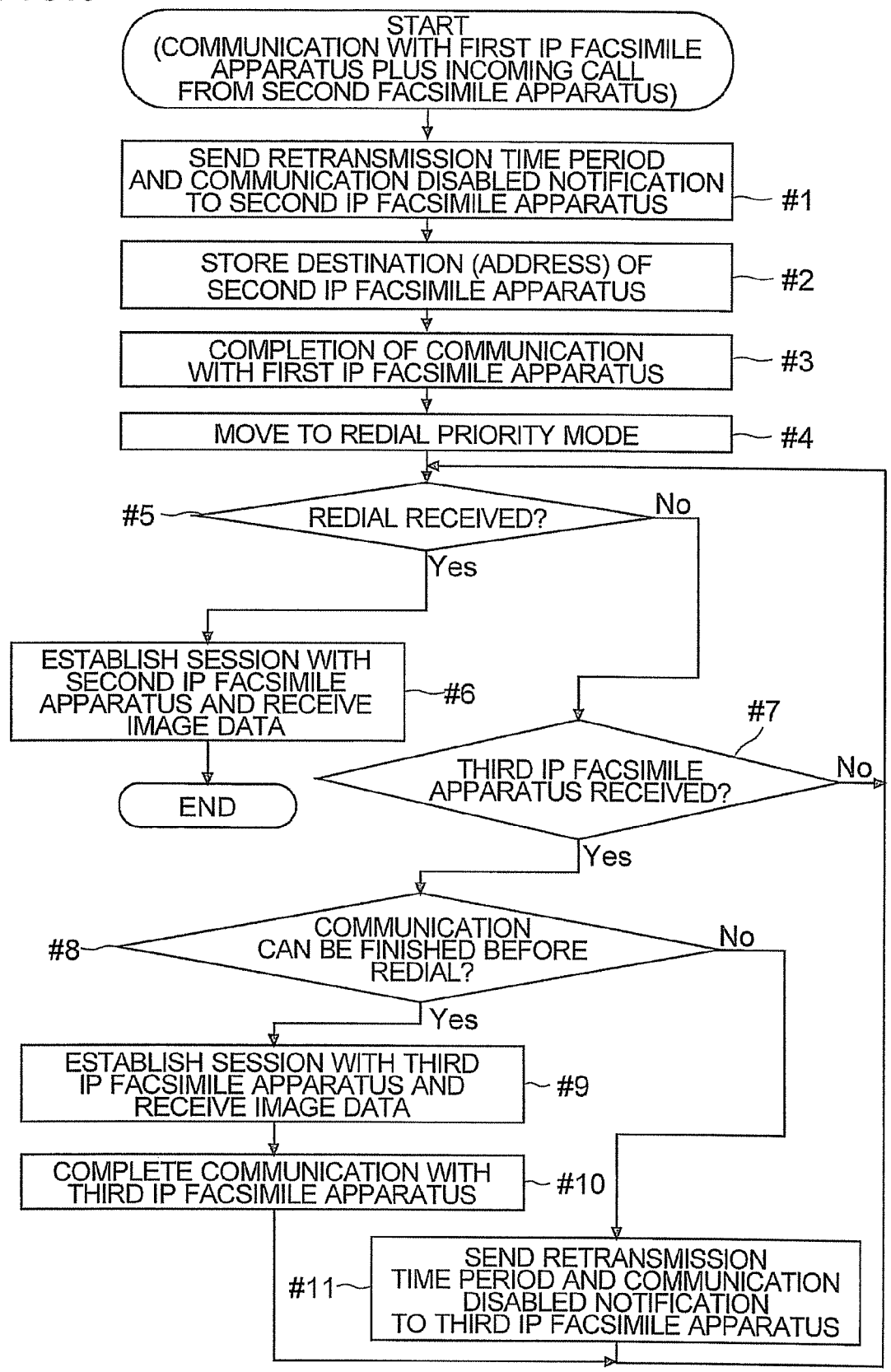
FIG. 8 is a flowchart illustrating a flow of control in communication between the multifunction peripheral and each of the IP facsimile apparatuses.

Next, with reference to FIG. 8, a control flow of communication between the multifunction peripheral 100 and each IP facsimile apparatus according to this embodiment is described. FIG. 8 is a flowchart illustrating a control flow of communication between the multifunction peripheral 100 and each IP facsimile apparatus.

First, the flow of FIG. 8 starts at a time point when the communication unit 11 (multifunction peripheral 100) receives the request to start communication (INVITE request) from the second IP facsimile apparatus 202 during data communication with the first IP facsimile apparatus 201.

First, the communication unit 11 transmits to the second IP facsimile apparatus 202 the communication disabled notification (Busy Here response) with the retransmission time period T1 attached in the Retry-after header field (Step #1). Then, the communication storage unit 111 of the communication unit 11 stores a destination (address) of the second IP facsimile apparatus 202 (Step #2). Next, the communication unit 11 completed the image data communication with the first IP facsimile apparatus 201 (Step #3).

Then, the communication unit 11 changes to a mode (redial priority mode) in which image data communication with other IP facsimile apparatus than the second IP facsimile apparatus 202 is not performed (Step #4). Next, the communication unit 11 (communication control unit 110) checks whether or not the request to start communication (INVITE request or redial) is received again from the second IP facsimile apparatus 202 (Step #5).

When the redial is received from the second IP facsimile apparatus 202 (Yes in Step #5), the communication unit 11 (communication control unit 110) establishes the session with the second IP facsimile apparatus 202 and receives image data from the second IP facsimile apparatus 202 (Step #6). Further, when the facsimile communication between the communication unit 11 and the second IP facsimile apparatus 202 is completed, this flow is finished (END).

On the other hand, when the redial from the second IP facsimile apparatus 202 is not received (No in Step #5), the communication unit 11 (communication control unit 110) checks whether or not the request to start communication is received from the third IP facsimile apparatus 203 (Step #7). When the request to start communication from the third IP facsimile apparatus 203 is not received (No in Step #7), the flow returns to Step #5. On the other hand, when the request to start communication is received from the third IP facsimile apparatus 203 (Yes in Step #7), the communication unit 11 (communication control unit 110) determines whether or not the communication can be completed before receiving the redial from the second IP facsimile apparatus 202 (Step #8).

When it is determined that the communication can be completed (Yes in Step #8), the communication unit 11 (communication control unit 110) establishes session with the third IP facsimile apparatus 203 and receives image data from the third IP facsimile apparatus 203 (Step #9). Then, the communication unit 11 finishes the facsimile communication with the third IP facsimile apparatus 203 (Step #10). On the other hand, when it is determined that the communication cannot be completed (No in Step #8), the communication unit 11 (communication control unit 110) transmits to the third IP facsimile apparatus 203 the communication disabled notification with the retransmission time period T1 attached in the Retry-after header field (Step #11). Then, the flow returns to Step #5.

In this way, the communication apparatus 1 of this embodiment includes the communication unit 11 performing data communication via the network (IP network 300). When receiving the request to start communication (INVITE request) from the second communication apparatus (second IP facsimile apparatus 202) during data communication with the first communication apparatus (first IP facsimile apparatus 201), the communication unit 11 transmits to the second communication apparatus the communication disabled notification (Busy Here response) and the retransmission time period T1 indicating the time period for the second communication apparatus to send again the request to start communication. After finishing the data communication with the first communication apparatus, when receiving the request to start communication from the third communication apparatus (third IP facsimile apparatus 203) before receiving the request to start communication sent again from the second communication apparatus based on the retransmission time period T1, the communication unit 11 does not start data reception from the third communication apparatus so as to give priority to data communication with the second communication apparatus.

In this way, the data communication with the second communication apparatus (second IP facsimile apparatus 202) is finished when receiving the request to start communication (INVITE request) again (redial) based on the retransmission time period T1 of the first time. Therefore, the number of redial times of the second communication apparatus is one, and hence wasteful repetition of redial of the second communication apparatus is avoided. Therefore, there is no wasteful repetition of redial, and data communication efficiency can be enhanced. In addition, there occurs no problem of unreceived data from the second communication apparatus due to communication error when the number of redial times exceeds an upper limit.

In addition, the communication apparatus 1 of this embodiment includes the communication unit 11 for performing the data communication via the network (IP network 300), and the determining unit (communication control unit 110). When receiving the request to start communication (INVITE request) from the second communication apparatus (second IP facsimile apparatus 202) during data communication with the first communication apparatus (first IP facsimile apparatus 201), the communication unit 11 transmits to the second communication apparatus the communication disabled notification (Busy Here response) and the retransmission time period T1 indicating the time period for the second communication apparatus to send again the request to start communication. After the data communication with the first communication apparatus is finished, when receiving the request to start communication from the third communication apparatus (third IP facsimile apparatus 203) before receiving the request to start communication sent again from the second communication apparatus based on the retransmission time period T1, the communication unit 11 does not start data reception from the third communication apparatus so as to give priority to data communication with the second communication apparatus. After the data communication with the first communication apparatus (first IP facsimile apparatus 201) is completed, when the request to start communication is received from the third communication apparatus (third IP facsimile apparatus 203) before receiving the request to start communication (INVITE request) sent again from the second communication apparatus (second IP facsimile apparatus 202) based on the retransmission time period T1, the determining unit (communication control unit 110) determines whether or not the communication with the third communication apparatus will be finished before receiving again the request to start communication from the second communication apparatus. When it is determined that the communication with the third communication apparatus will be finished, the communication unit 11 releases the priority of the communication with the second communication apparatus as an exception so as to perform data communication with the third communication apparatus. When it is determined that the communication with the third communication apparatus will not be finished, the communication unit 11 transmits to the second communication apparatus the communication disabled notification (Busy Here response) with the retransmission time period T1.

In this way, the data reception is allowed, which has a short communication time period such that the reception can be completed before receiving the request to start communication (INVITE request or redial) sent again from the second communication apparatus (second IP facsimile apparatus 202). Therefore, data can be received efficiently so that the number of the communication apparatuses 1 waiting communication permission can be reduced.

In data reception from a specific other party, it is rare that a size of data to be received is abruptly increased. Rather, it is common that a size of received data is within a substantially constant range in such a case where typical document data is communicated. Therefore, the communication apparatus 1 of this embodiment includes the communication storage unit 111 for storing the communication necessary time T2 from receiving the request to start communication (INVITE request) until the data reception is completed as the history data D0. Among the history data D0 stored in the communication storage unit 111, based on the communication necessary time T2 of the third communication apparatus (third IP facsimile apparatus 203), the determining unit (communication control unit 110) determines whether or not the communication with the third communication apparatus is completed before receiving the request to start communication sent again from the second communication apparatus (second IP facsimile apparatus 202).

Specifically, the determining unit (communication control unit 110) extracts from the history data D0 the communication necessary time T2 corresponding to the third communication apparatus (third IP facsimile apparatus 203) that has transmitted the request to start communication during the wait time of the request to start communication sent again from the second communication apparatus (second IP facsimile apparatus 202) based on the retransmission time period T1, and determines whether or not the communication with the third communication apparatus can be completed based on whether or not the time point obtained by adding the extracted communication necessary time T2 to the time point when the third communication apparatus transmitted the request to start communication is before the time point when the second communication apparatus sends again the request to start communication based on the retransmission time period T1.

In addition, when the communication unit 11 receives from the third communication apparatus (third IP facsimile apparatus 203) the size information indicating a size of data to be transmitted from the third communication apparatus, the determining unit (communication control unit 110) calculates the time period (transfer necessary time 13) necessary for completing to receive data from the third communication apparatus after receiving the request to start communication (INVITE request) from the third communication apparatus, and determines based on the determined time period whether or not the communication with the third communication apparatus will be completed before receiving the request to start communication sent again from the second communication apparatus (second IP facsimile apparatus 202).

Specifically, when the communication unit receives the size information from the third communication apparatus (third IP facsimile apparatus 203), the determining unit (communication control unit 110) recognizes data reception amount from the third communication apparatus per unit time period after receiving the request to start communication from the third communication apparatus so as to determine the data transfer speed, and divides the data size indicated in the size information by the determined data transfer speed so as to determine the communication necessary time 13. Then, the determining unit (communication control unit 110) determines whether or not the image data reception from the third communication apparatus can be completed based on whether or not the time point obtained by adding the determined communication necessary time 13 to the time point when the request to start communication is received from the third communication apparatus is before the time point when the second communication apparatus (second IP facsimile apparatus 202) sends again the request to start communication based on the retransmission time period T1.

In addition, the size information is not always received. Therefore, when the request to start communication from the third communication apparatus (third IP facsimile apparatus 203) includes the size information, the determining unit (communication control unit 110) performs the determination based on the size information. When the request to start communication does not include the size information, the determining unit (communication control unit 110) performs the determination based on the communication necessary time 12 with the third communication apparatus (third IP facsimile apparatus 203) extracted from the history data D0.

In this way, based on the past communication history (experience or record), or based on an actual size of the data to be communicated, it is possible to correctly determine whether or not the communication with the third communication apparatus (third IP facsimile apparatus 203) will be completed before receiving the request to start communication (INVITE request or redial) sent again from the second communication apparatus (second IP facsimile apparatus 202). Therefore, the communication with the second communication apparatus based on redial is not interrupted by the third communication apparatus. Further, the communication disabled notification due to busy state is not sent again to the second communication apparatus. Therefore, it is possible to prevent repetition of redial by the second communication apparatus.

In addition, the communication unit 11 performs the communication with the first, second, and third communication apparatuses using the IP network 300 (IP network 300). The first, second, and third communication apparatuses are the IP facsimile apparatuses, and the data to be communicated (facsimile data to be transmitted and received by facsimile communication) is image data.

In this way, in the image data transmission and reception between the IP facsimile apparatuses, the IP facsimile apparatus does not repeat the redial and can communicate image data efficiently and smoothly.

The image forming apparatus (multifunction peripheral 100) of this embodiment includes the communication apparatus 1 described above. With this structure, it is possible to provide the image forming apparatus (multifunction peripheral 100) that can perform the data communication with high efficiency without repeating the redial.

The embodiment of the present disclosure is described above, but the scope of the present disclosure is not limited to the description of the embodiment and can be embodied with various modification within the scope not deviating from the spirit of the disclosure.

What is claimed is:
1. A communication apparatus comprising:
a communication unit configured to perform data communication via a network; when receiving a request to start communication from a second communication apparatus during data communication with a first communication apparatus, to transmit to the second communication apparatus a communication disabled notification together with a retransmission time period to indicate a time period for the second communication apparatus to send the request to start communication again; and when receiving a request to start communication from a third communication apparatus after data communication with the first communication apparatus is completed and before receiving a request to start communication from the second communication apparatus again based on the retransmission time period, not to start data reception from the third communication apparatus so as to give priority to data communication with the second communication apparatus;
a determining unit configured to determine whether or not communication with the third communication apparatus will be completed before receiving the request to start communication sent again from the second communication apparatus, when receiving request to start communication from the third communication apparatus after completing the data communication with the first communication apparatus and before receiving the request to start communication sent again from the second communication apparatus based on the retransmission time period, wherein
when determining that the communication with the third communication apparatus will be completed, the communication unit releases the priority of the communication with the second communication apparatus as an exception so as to perform data communication with the third communication apparatus, and
when determining that the communication with the third communication apparatus will not be completed, the communication unit transmits the communication disabled notification with the retransmission time period to the third communication apparatus.

2. The communication apparatus according to claim 1, further comprising a communication storage unit for storing communication necessary time from reception of the request to start communication until completion of data reception as history data, wherein
the determining unit determines whether or not the communication with the third communication apparatus is completed before receiving the request to start communication sent again from the second communication apparatus based on the communication necessary time of the third communication apparatus among the history data stored in the communication storage unit.

3. The communication apparatus according to claim 2, wherein the determining unit extracts from the history data the communication necessary time corresponding to the third communication apparatus that has transmitted the request to start communication during wait time of the request to start communication sent again from the second communication apparatus based on the retransmission time period, and determines whether or not the communication with the third communication apparatus can be completed based on whether or not a time point obtained by adding the extracted communication necessary time to the time point when receiving the request to start communication from the third communication apparatus is before the time point when the second communication apparatus sends again the request to start communication based on the retransmission time period.

4. The communication apparatus according to claim 1, wherein when the communication unit receives from the third communication apparatus size information indicating a size of data to be transmitted by the third communication apparatus, the determining unit calculates a time period necessary for completing data reception from the third communication apparatus after receiving the request to start communication from the third communication apparatus, and determines whether or not the communication with the third communication apparatus will be completed before receiving the request to start communication sent again from the second communication apparatus based on the calculated time period.

5. The communication apparatus according to claim 4, wherein when the communication unit receives the size information from the third communication apparatus, the determining unit recognizes a data reception amount from the third communication apparatus per unit time when receiving the request to start communication from the third communication apparatus so as to determine a data transfer speed, determines a transfer necessary time by dividing a data size indicated in the size information by the data transfer speed, and determines whether or not the data reception from the third communication apparatus can be completed based on whether or not a time point obtained by adding the determined transfer necessary time to the time point when the request to start communication is received from the third communication apparatus is before the time point when the second communication apparatus sends again the request to start communication based on the retransmission time period.

6. The communication apparatus according to claim 1, further comprising a communication storage unit for storing communication necessary time for completing the data reception after receiving the request to start communication as history data, wherein
    when the communication unit receives size information indicating a size of data to be transmitted by the third communication apparatus at a time point of the request to start communication from the third communication apparatus, the determining unit calculates a time period necessary for completing data reception from the third communication apparatus after receiving the request to start communication from the third communication apparatus, and determines whether or not the communication with the third communication apparatus will be completed before receiving the request to start communication sent again from the second communication apparatus based on the calculated time period, and
    when the communication unit has not received the size information indicating the size of data to be transmitted by the third communication apparatus at the time point of the request to start communication from the third communication apparatus, the determining unit determines whether or not the communication with the third communication apparatus will be completed before receiving the request to start communication sent again from the second communication apparatus based on the communication necessary time of the third communication apparatus among the history data stored in the communication storage unit.

7. The communication apparatus according to claim 1, wherein
    the communication unit performs communication with the first, second, and third communication apparatuses using an IP network,
    the first, second, and third communication apparatuses are IP facsimile apparatuses, and
    facsimile data transmitted and received by facsimile communication is image data.

8. An image forming apparatus comprising the communication apparatus according to claim 1.

9. A control method for a communication apparatus, comprising the steps of:
    performing data communication via a network;
    transmitting to a second communication apparatus a communication disabled notification with a retransmission time period indicating a time period for the second communication apparatus to send again a request to start communication, when receiving the request to start communication from the second communication apparatus during data communication with a first communication apparatus; and
    giving priority to data communication with the second communication apparatus without starting data reception from a third communication apparatus, when receiving a request to start communication from the third communication apparatus after completing the data communication with the first communication apparatus and before receiving the request to start communication sent again from the second communication apparatus based on the retransmission time period; determining whether or not the communication with the third communication apparatus will be completed before receiving the request to start communication sent again from the second communication apparatus, when receiving the request to start communication from the third communication apparatus after the data communication with the first communication apparatus is completed and before receiving the request to start communication sent again from the retransmission time period based on the second communication apparatus;
    releasing the priority of the communication with the second communication apparatus as an exception so as to perform the data communication with the third communication apparatus when it is determined that the communication with the third communication apparatus will be completed; and
    transmitting the communication disabled notification with the retransmission time period to the third communication apparatus when it is determined that the communication with the third communication apparatus will not be completed.

* * * * *